US 6,540,038 B2

(12) United States Patent
Taylor et al.

(10) Patent No.: US 6,540,038 B2
(45) Date of Patent: Apr. 1, 2003

(54) VEHICLE CAB SUSPENSION SYSTEM

(75) Inventors: Michael A. Taylor, Lafayette, IN (US);
Benjamin S. Puterbaugh, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 10/116,303

(22) Filed: Apr. 4, 2002

(65) Prior Publication Data

US 2002/0162697 A1 Nov. 7, 2002

Related U.S. Application Data

(60) Provisional application No. 60/289,021, filed on May 4, 2001.

(51) Int. Cl.[7] ............................................. B62D 33/063
(52) U.S. Cl. ............................... 180/89.13; 280/124.1; 296/190.07
(58) Field of Search ..................... 180/89.12, 89.13, 180/89.14; 280/124.1; 296/190.01, 190.07

(56) References Cited

U.S. PATENT DOCUMENTS

| | | | | |
|---|---|---|---|---|
| 3,944,017 A | * | 3/1976 | Foster ..................... | 180/89.15 |
| 4,438,970 A | * | 3/1984 | Boucher .................. | 180/89.14 |
| 4,807,713 A | * | 2/1989 | Smith et al. ............. | 180/89.14 |
| 4,871,189 A | | 10/1989 | Van Breemen | |
| 4,989,684 A | * | 2/1991 | Conaway .................. | 180/89.15 |
| 5,109,939 A | * | 5/1992 | Conaway et al. ........ | 180/89.15 |
| 5,209,316 A | * | 5/1993 | Bauer ....................... | 180/89.14 |
| 5,253,853 A | * | 10/1993 | Conaway et al. ........ | 180/89.15 |
| 5,553,911 A | * | 9/1996 | Bodin et al. ............. | 180/89.12 |
| 5,579,860 A | * | 12/1996 | Halverson et al. ....... | 180/89.14 |
| 5,957,231 A | * | 9/1999 | Conaway et al. ........ | 180/89.13 |
| 5,967,597 A | * | 10/1999 | Vander Kooi et al. ... | 180/89.13 |
| 6,109,381 A | * | 8/2000 | Stuyvenberg et al. .... | 180/89.12 |
| 6,168,229 B1 | * | 1/2001 | Kooi et al. ............ | 296/190.05 |
| 6,390,485 B1 | * | 5/2002 | Cadden ................... | 280/124.1 |

* cited by examiner

Primary Examiner—Paul N. Dickson
Assistant Examiner—Deanna Draper
(74) Attorney, Agent, or Firm—Jeffrey P. Calfa; Neil T. Powell; Dennis Kelly Sullivan

(57) ABSTRACT

A truck cab suspension system provides improved durability of the truck cab structure by reducing twisting forces applied to the cab frame from the suspension system. The suspension system provides support to the rear sill of the truck by positioning two air springs on either side of the vehicle center line under the sill and two shock absorbers aligned along the vehicle center line between the air springs. The forces applied to the cab frame rear sill balance one another avoiding twisting.

11 Claims, 11 Drawing Sheets

VEHICLE CAB SUSPENSION SYSTEM

CROSS REFERENCE TO RELATED APPLICATION

This non-provisional application claims the priority of provisional application no. 60/289,021 filed May 4, 2001.

BACKGROUND OF THE INVENTION

1. Field of the Invention:

The present invention relates to a cab suspension system for trucks and, more specifically, relates to a suspension providing minimum bending moment or twist to a truck cab rear sill.

2. Description of the Problem:

It is desirable to isolate vehicle cabs and their occupants from shock and vibration of a truck's chassis. This provides for the occupants' comfort and extends the life of the cab by reducing stress which promotes structural damage to the cab, particularly to spot welds used to attach thin sheet metal components used for cab components such as the floor and the vehicle's skin to the cab's frame.

The load carried by a truck is supported by a frame which is resiliently carried by suspension springs and supported by the truck's wheels. Wheel suspension springs have very high spring rates which makes the ride jarring to the operator and to structures supported by the frame. To dampen the vibration and shock transmitted to the cab, suspension systems have been employed utilizing conventional suspension components such as air springs and shock absorbers to isolate the cab structure from shock and to dampen motion of the cab, respectively.

Cab suspensions have been situated close to the center line of the vehicle, and have positioned the air spring and primary damping elements of the suspension inward from the frame rails and underneath the rear sill of the cab. Due to space constraints and the desirability of enhancing damping to cab roll, prior art suspension systems have positioned shock damping devices offset from the centerline of the rear sill toward the front of the vehicle. Off centerline shock damping induces a bending moment or twist to the cab rear sill, inducing stress in the cab, particularly between the sill and sheet metal floor panels welded to the sill.

An example of such a cab suspension system is described in U.S. Pat. No. 5,109,939 to Conaway et al. In order to position suspension elements close to the vehicle center line under the cab, a rigid base member perpendicular to and breaching the gap between the frame rails is placed under the rear of the cab. A rigid impact plate is provided above the base member and parallel thereto for attachment to the cab bottom. Between the base member and the impact plate are a pair of air springs oriented for vertical compression and aligned across the direction of elongation of the vehicle. A pair of shock absorbers are located toward the front of the vehicle just forward from the air springs. The shock absorbers are aligned on one another perpendicular to the direction of elongation of the vehicle and both are inwardly canted from bottom to top and pivotally mounted to the impact plate. The central axes of the shock absorbers and the support member and impact plate generally form a trapezoid, controlling roll, but resulting in twisting forces transmitted through the shock absorbers about the cab's rear sill.

According to the invention there is provided a vehicle having a suspended cab. The vehicle has a chassis with elongated side frame rails and cross members connected between the side frame rails. One cross member provides support for the back of a vehicle cab. A cab attachment plate is supported above the cross member and provides for attachment to a cab rear sill in the floor of the cab. A pair of air springs is disposed, latitudinally aligned between the attachment plate and the cross member, for supporting the cab. Fore and aft shock absorbers, aligned along the vehicle center line are attached between the cab attachment plate and the cross member member for damping vertical movement of the cab.

SUMMARY OF THE INVENTION

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
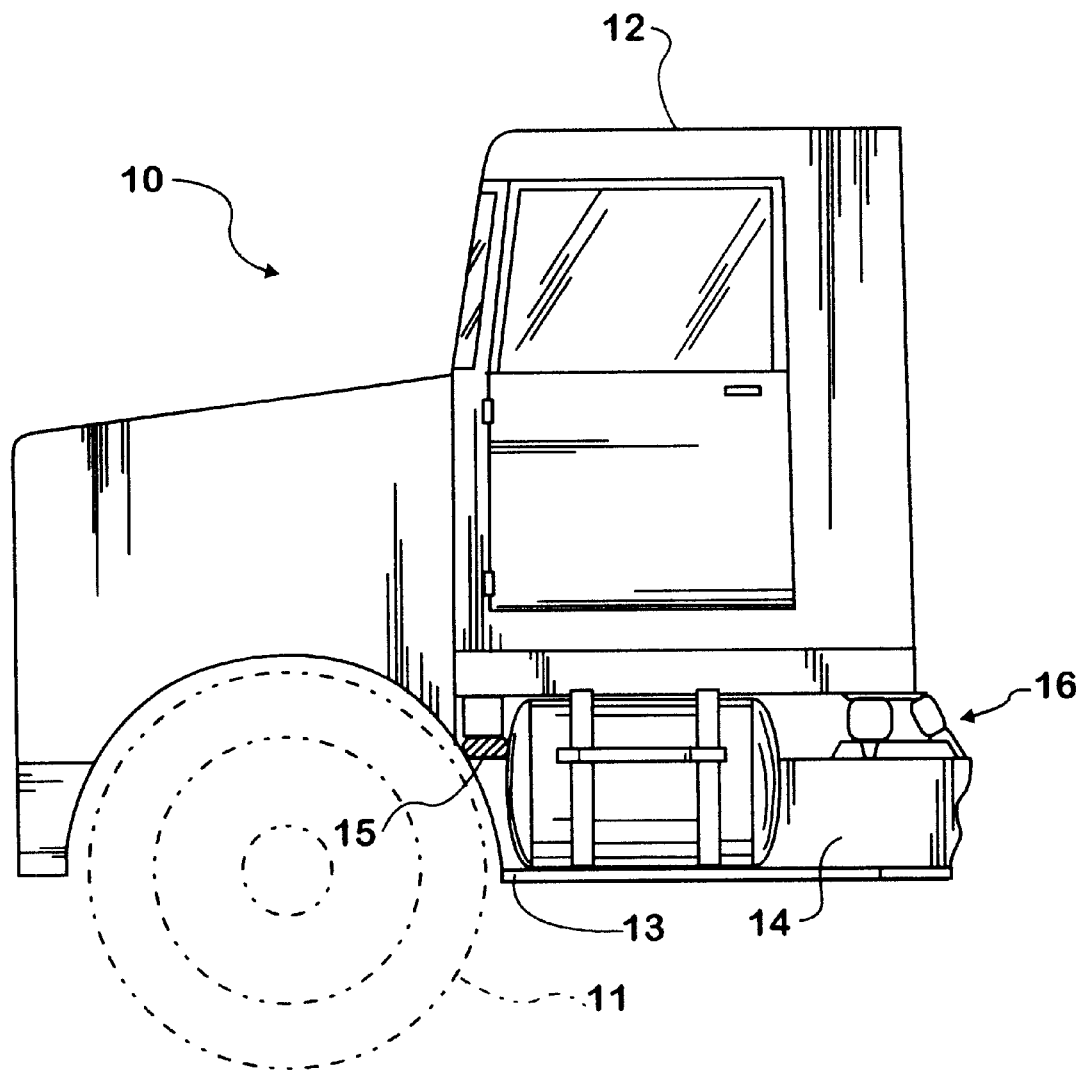
FIG. 1 is a side elevation of a truck illustrating positioning of the suspension system of the present invention between the cab and the frame.

Referring now to the figures and in particular to FIG. 1 there is illustrated a truck 10 including a cab 12 supported on a vehicle frame 13. Frame 13 provides for the attachment of wheels 11 and includes a pair of side rails 14, which run substantially the length of the vehicle, Cab 12 is suspended above frame 13 on cab suspension elements 15 and 16. The forward cab suspension 15 is conventional and secures the forward portion of the cab 12 to the frame 13. Forward cab suspension 15 may include a vibration isolating sub element.

Rear cab suspension 16, according to a preferred embodiment of the present invention, is attached to a rear sill of the cab 12 in a way largely eliminating the application of twisting motions to the sill to prolong the service life of spot welds of the re sill.

Figure 2:
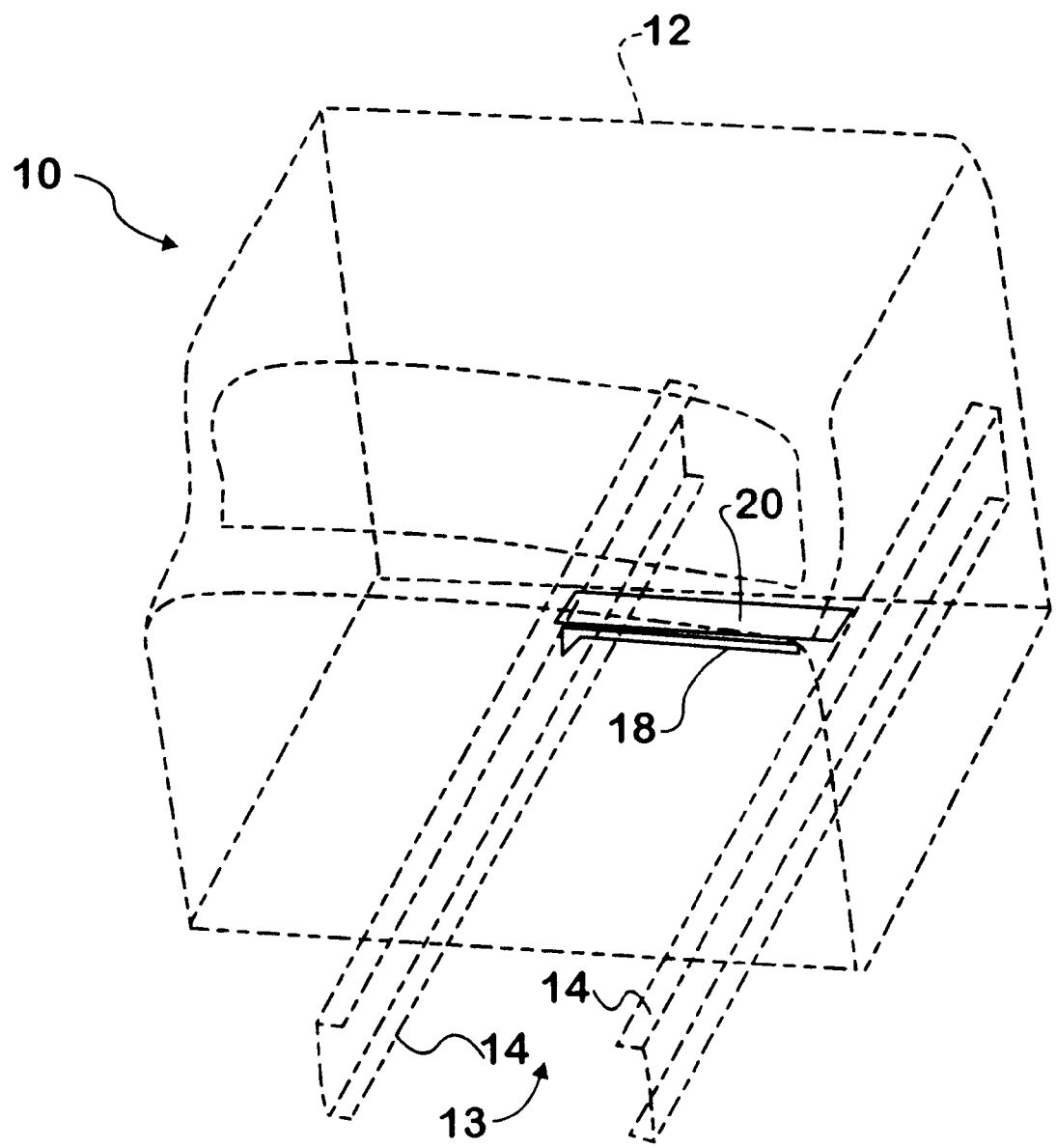
FIG. 2 is a perspective view of the suspension system of the present invention showing placement thereof relative to the truck cab and frame, both of which are shown in phantom.

Referring now to FIG. 2, the positioning of rear cab suspension attachment plate 20 between a cab 12 and frame 13 of truck 10 is better illustrated. Attachment plate 20 is mounted above a cross member 18 which in turn is positioned extending between parallel side frame rails 14. Attachment plate 20 is positioned directly below the bottom of cab 12 to support the cab from below. Attachment plate 20 may be connected by appropriate fasteners to the framing for cab 12.

Figure 3:
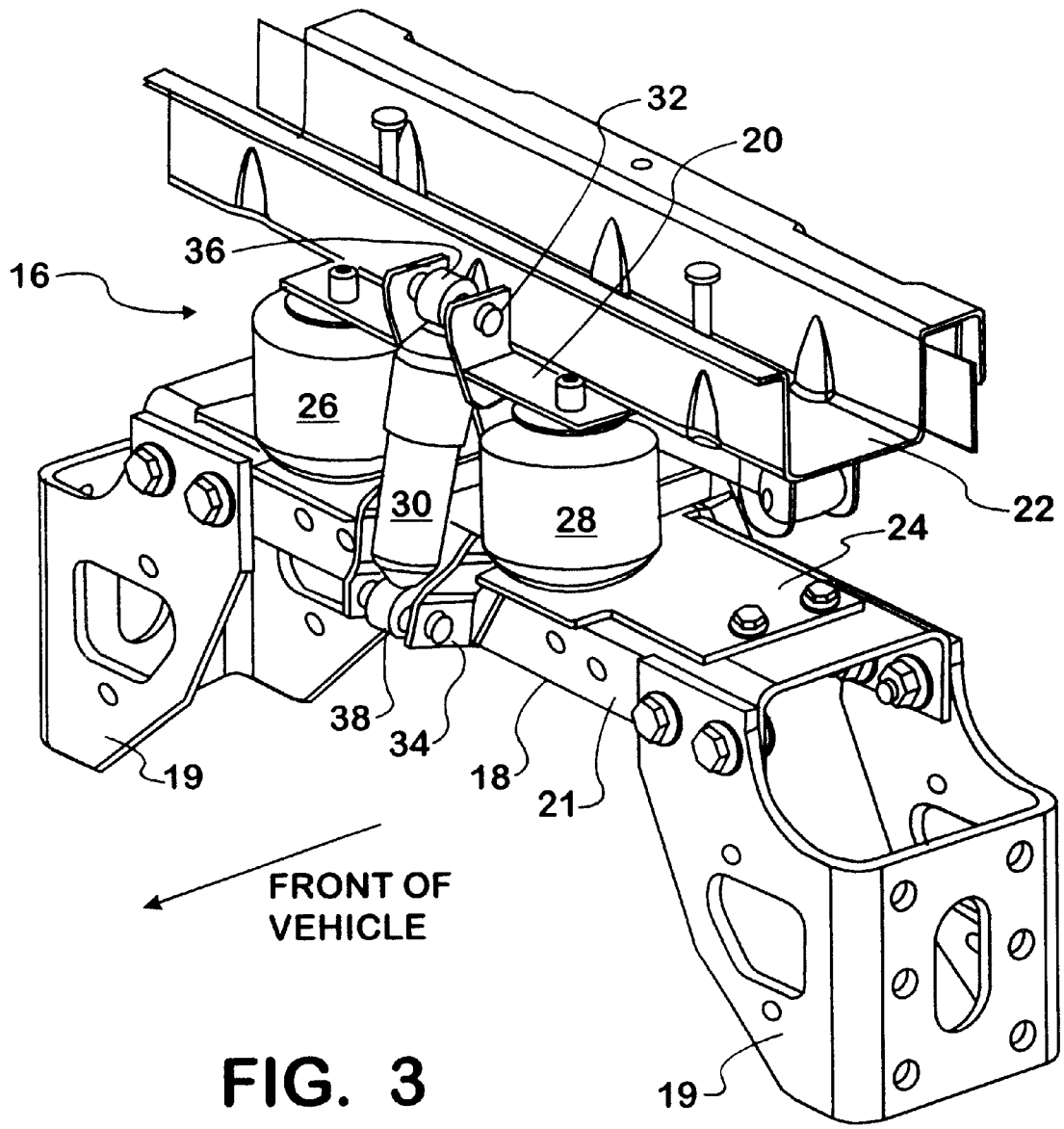
FIG. 3 is a perspective view of the suspension system from an upper front quarter perspective, with the suspension system placed in its operating environment between a frame cross member and a rear sill structural member of a truck cab.

FIG. 3 illustrates rear cab suspension assembly 16 in greater detail. Cab suspension assembly 16 is mounted on top of a cross member 18. Cross member 18 is positioned latitudinally oriented between the frame siderails at a position under the intended installation point for the aft portion of vehicle cab 12. Cross member 18 includes two end brackets 19 for attachment, one each, to each of the respective side rails. End brackets 19 are positionable along the frame side rails allowing the cross member 18 to be correctly positioned. A C-channel 21 is mounted between the brackets 19 and provides a support point to the suspension assembly 16. Cab suspension assembly 16 underlies a rear sill 22, which is part of the structural assembly of cab 12 and is one member to which the cab floor is mounted.

Cab suspension assembly 16 includes a support plate 24 resting on and attached to cross member 18 and attachment plate 20, which is positioned above and parallel to the support plate in supporting contact with rear sill 22. Attachment plate 20 is suspended above support plate 24 by a pair of air springs 26 and 28, which are aligned with one another in the direction of elongation of cross member 18. Air springs 26 and 28 have vertical axes perpendicular to attachment plate 20 and support plate 24 and are attached to the attachment plate and support plate by conventional means.

Attachment plate 20 and support plate 24 each have associated brackets 32 and 34, respectively, for the attachment of a forward shock absorber 30. Forward shock absorber 30 is mounted to exert damping force in the plane of the longitudinal center line A of the vehicle, being mounted predominantly vertically, but inclined toward the rear of the vehicle at the top. Attachment of the bottom of the shock absorber 30 to bracket 34 is by a pivot mount 38, while the top of the shock absorber is mounted in bracket 32 by a similar pivoting mount 36.

Figure 4:
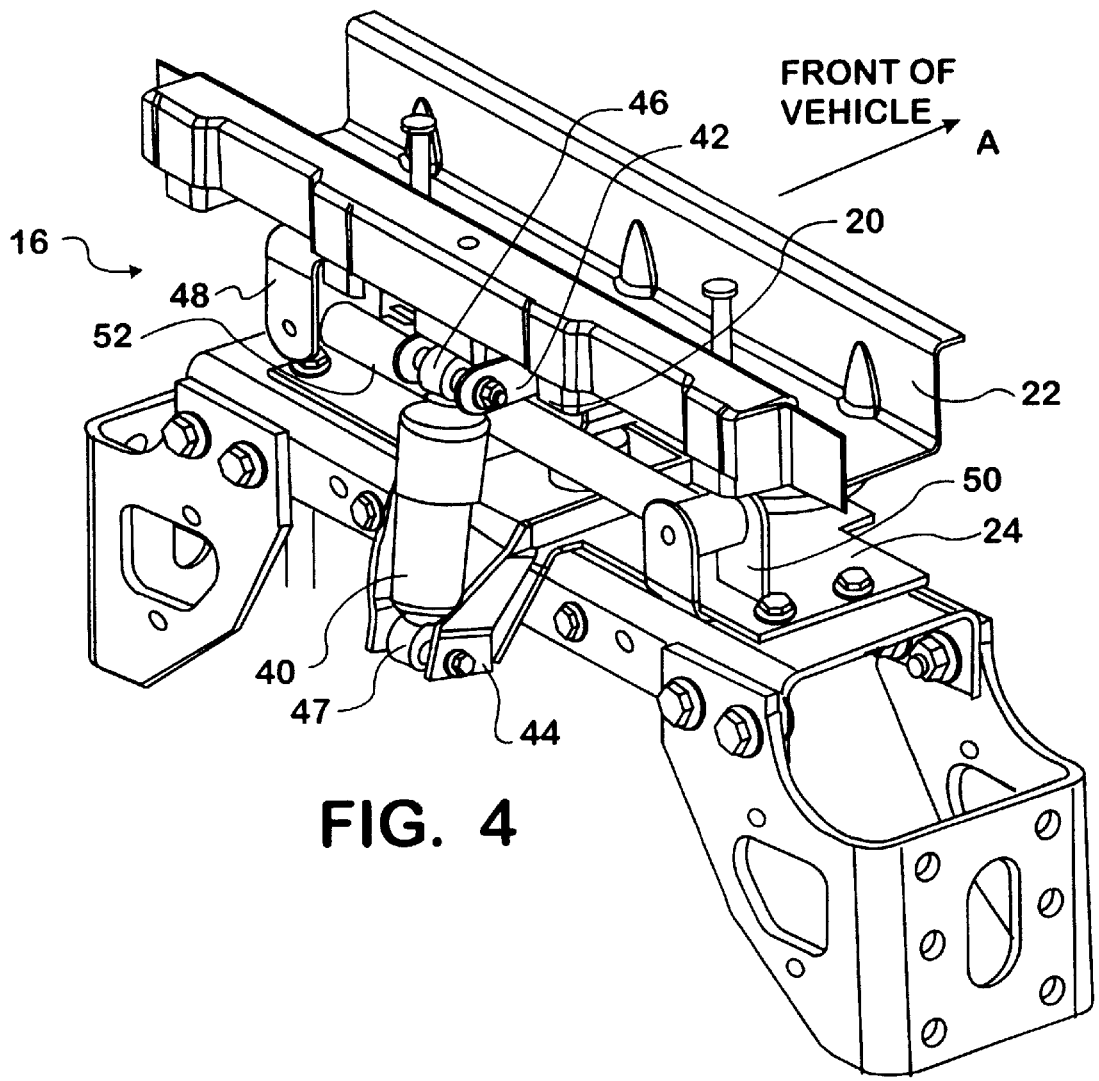
FIG. 4 is a perspective view of the suspension system from an upper rear quarter perspective with the suspension system placed in its operating environment.
Figure 5:
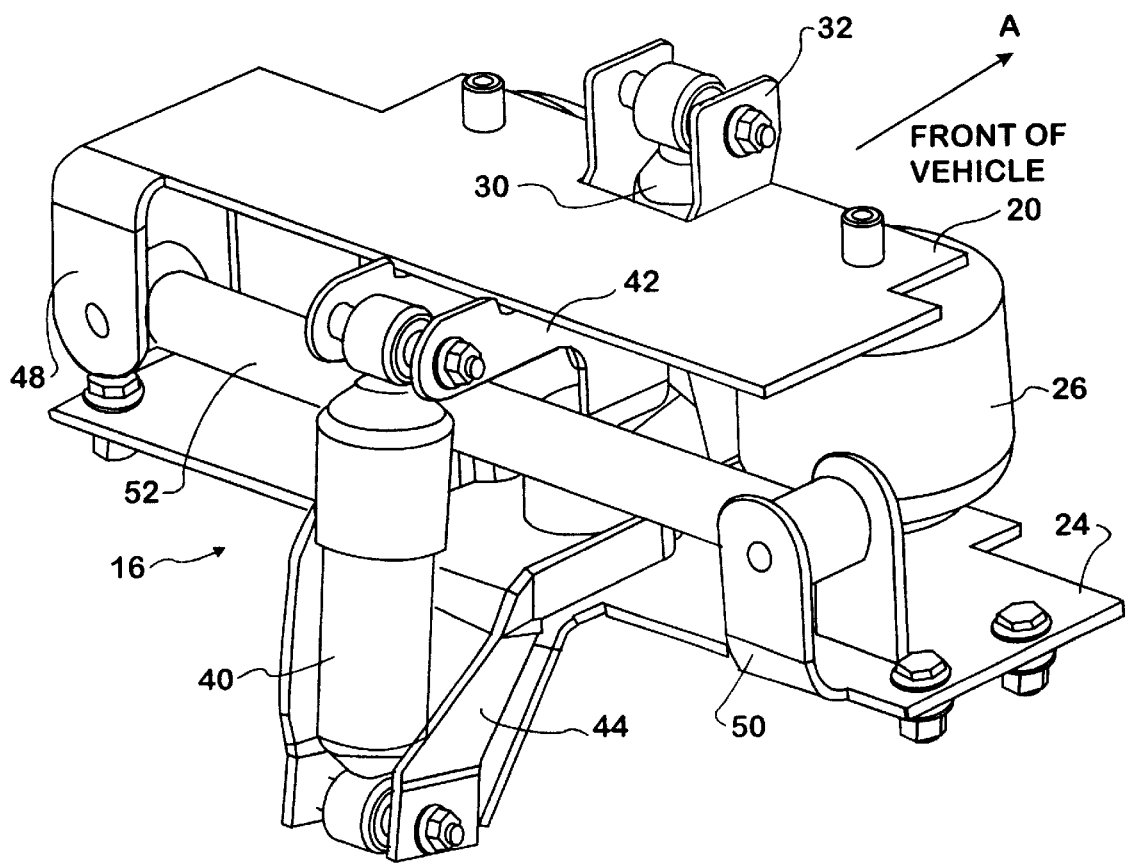
FIG. 5 is an upper rear quarter perspective view of the suspension system.

Referring to FIGS. 4 and 5 suspension assembly 16 is presented in perspective from the rear quarter, looking down. In FIG. 4 the suspension assembly is presented in its preferred operating environment, and in FIG. 5 cab suspension assembly 16 is illustrated free of other vehicle structural elements. The remaining major elements of suspension assembly 16 are now illustrated, including a pan hard rod 52 providing side to side positional stability of the cab 12 to counter roll occurring during cornering. An aft or rear shock absorber 40 dampens oscillation of cab 12, generating forces aligned with a plane including the center line A of the vehicle. Panhard rod 52 is pivotally mounted in brackets 48 and 50, with bracket 48 extending downwardly from attachment plate 20 along one end of the cross member 18 and bracket 50 extending upwardly from support plate 24 toward the opposite end of the cross member. Rear shock absorber 40 is mounted between brackets 42 and 44, with bracket 42 extending rearwardly from attachment plate 20 and bracket 44 extending rearwardly and downwardly from the back of support plate 24. The top end of shock absorber 40 is attached to bracket 42 by a pivot mount 46 and the bottom end of the shock absorber is attached in bracket 44 on a pivoting mount 47. Shock absorber 40 is inclined toward the front of the vehicle from bottom to top, meaning that damping force exerted by the shock absorber is in the plane including the vehicle center line and intersects the line of force from the forward shock absorber above the assembly. Shock absorbers 30 and 40 are located between air springs 26 and 28 on the center line A of the vehicle. Front shock absorber 30 is typically located somewhat higher than rear shock absorber 40 to provide room below the assembly 16 to accommodate the rear end of a transmission housing (not shown). Air springs 26 and 28 are aligned perpendicular to and on either side of the center line.

Figure 6:
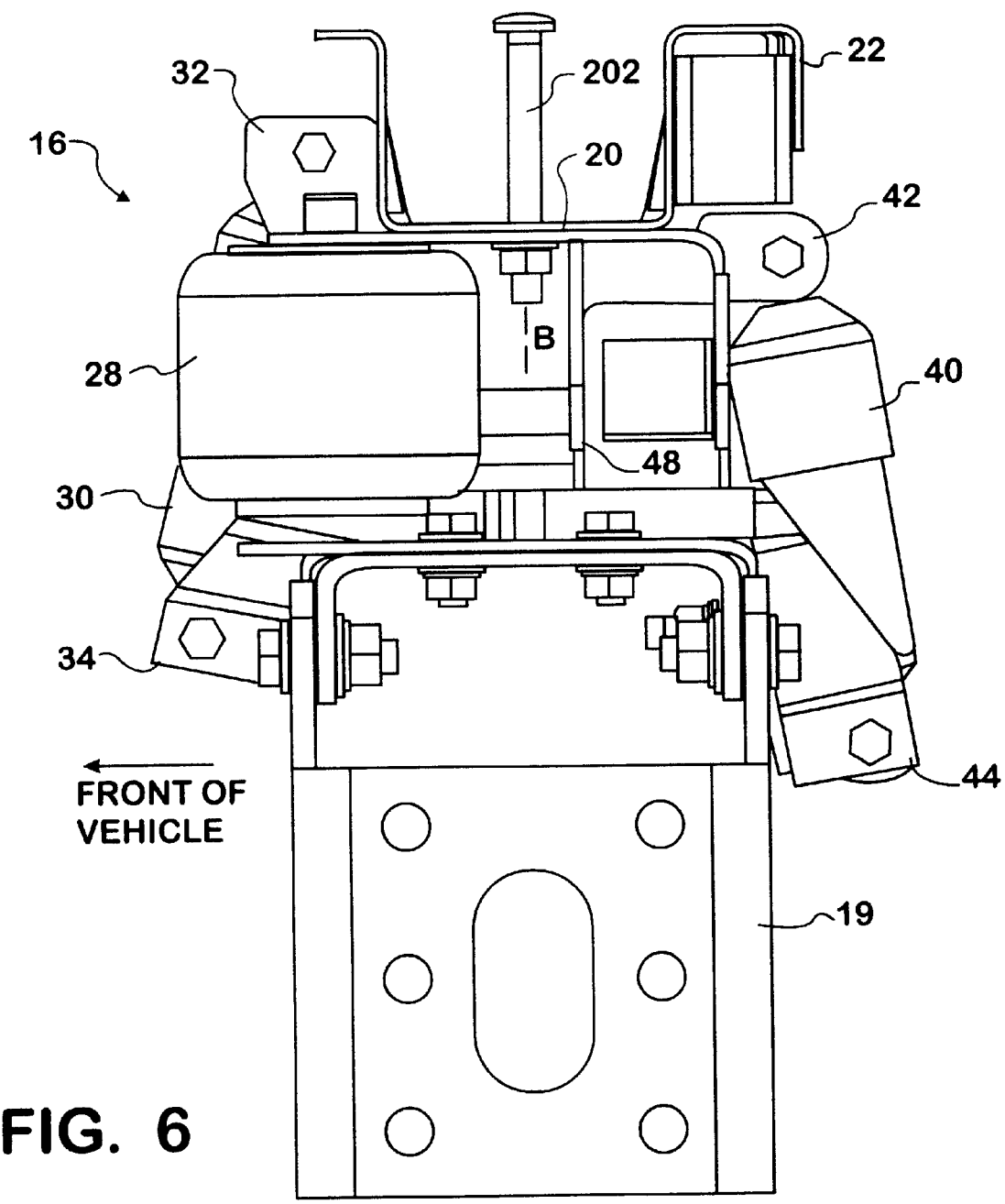
FIG. 6 is a side elevation of the suspension system in its operating environment.
Figure 7:
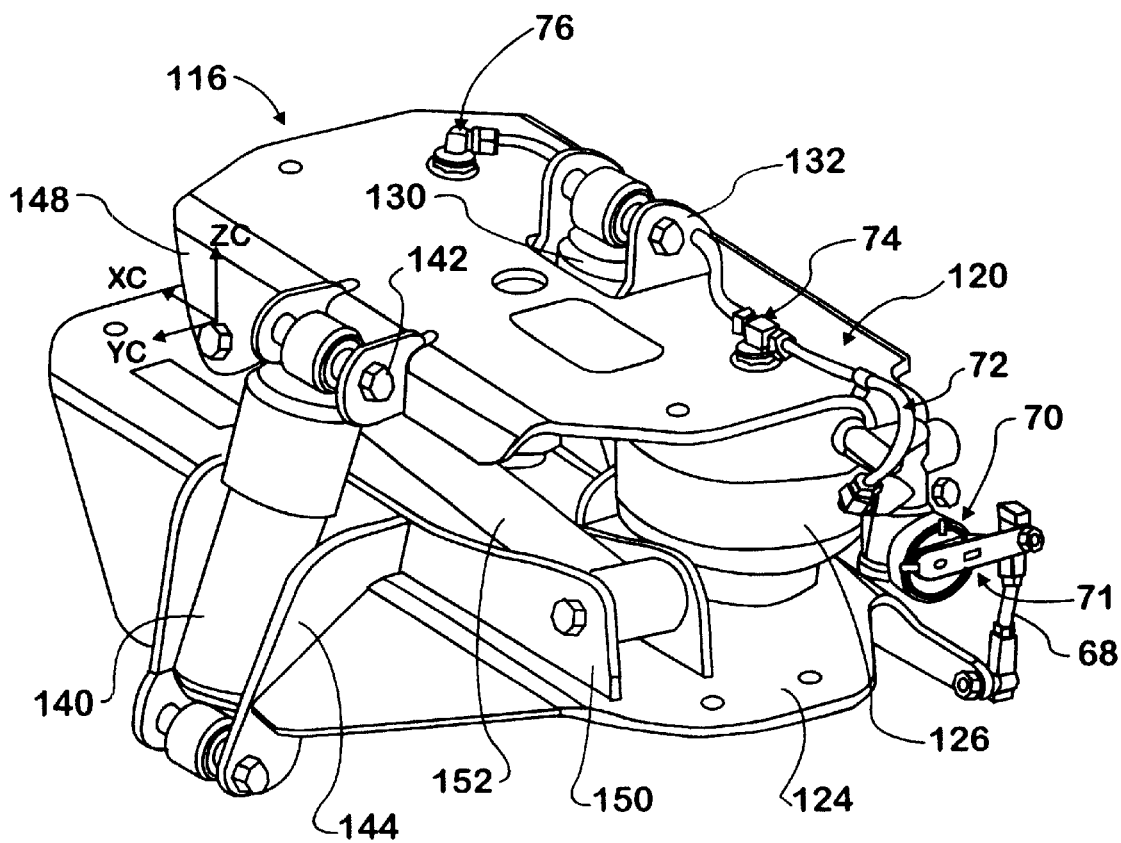
FIG. 7 is an upper rear quarter perspective view of the suspension system in an alternative embodiment.
Figure 8:
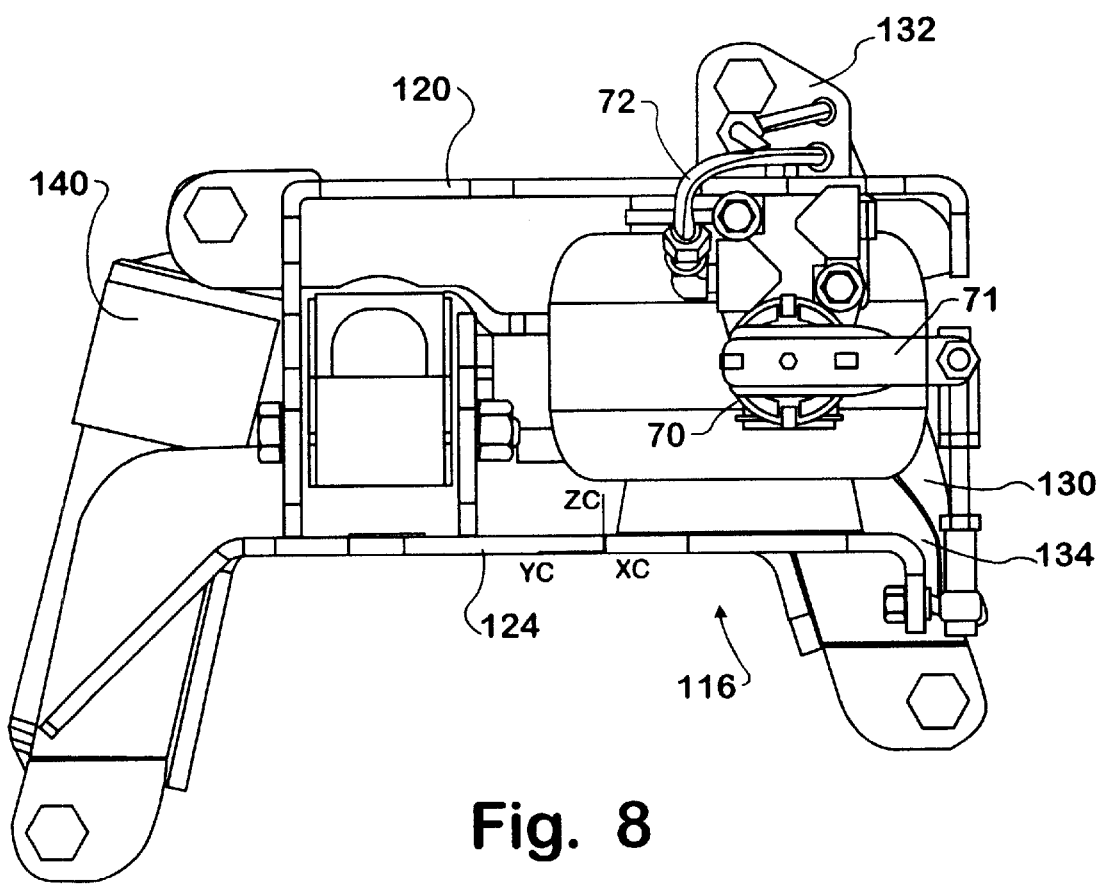
FIG. 8 is a side elevation of the suspension system of FIG. 7.
Figure 9:
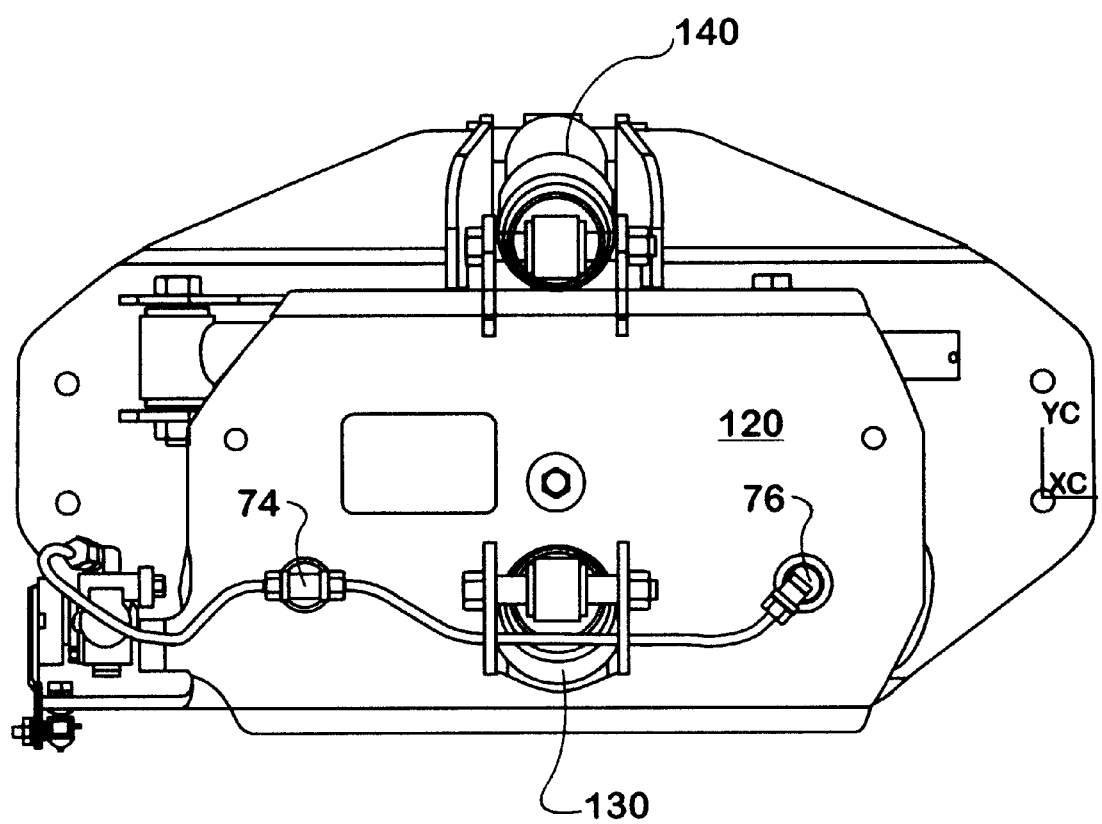
FIG. 9 is a bottom view of the alternative suspension system.
Figure 10:
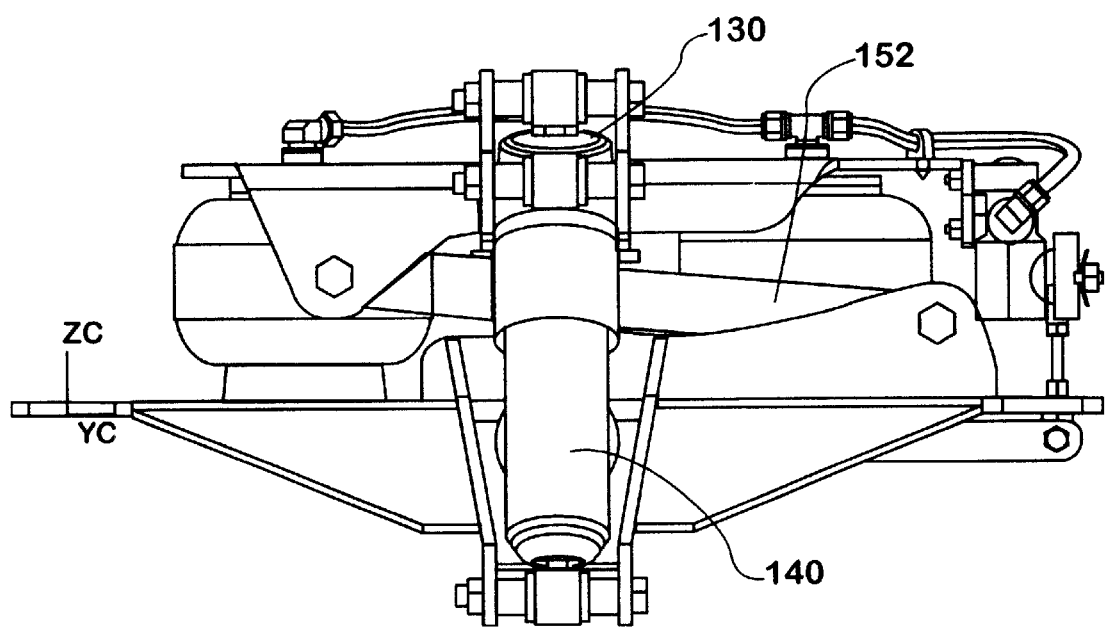
FIG. 10 is a rear elevation of the alternative suspension system.

FIG. 6 presents a side elevation of cab suspension assembly 16 illustrating the cooperating inclination of the front and rear shock absorbers 30 and 40. It may be seen in the figure that the top ends of shock absorbers 30 and 40 are attached by brackets 32 and 42, respectively, which depend from opposite edges of attachment plate 20. The top ends of shock absorbers 30 and 40 are inclined toward one another, resulting in damping forces generated by the shock absorbers converging on one another, approximately above the center line B of sill 22, which is also aligned with a bolt 202 used to attach the sill to attachment plate 20.

Referring now to FIGS. 7–10, an alternative embodiment of a cab suspension assembly 116 is illustrated, modified for greater spacing between a cab 12 and cross member 18. A pair of air springs 126 and 128 are positioned between a support plate 124 and an attachment plate 120. Forward and rear shock absorbers 130 and 140 are mounted by brackets, including brackets 142 and 144 for shock absorber 140 and brackets 132 and 134 for shock absorber 130. Shock absorbers 130 and 140 function in the same manner as the shock absorbers described in connection with the first embodiment and again are positioned on the vehicle center line A.

The air pressure of the air springs 126 and 128 may be adjusted through a displacement sensitive valve 70, which depends from attachment plate 120 and which is actuated by a rod arm 68. Rod arm 68 is connected at one end to an arm of support plate 124 and at its opposite end to an valve 70 actuation arm 71. An air line 74 is connected from valve 70 to air springs 126 and 128 by connectors 74 and 76, respectively. Valve 70 receives air from compressed air source (not shown) commonly available on trucks and delivers the air to the springs if displacement is less than a datum. Air may be discharged from the springs through valve 70 when displacement exceeds the datum.

Valve 70 depends from an extension of attachment plate 120. A valve actuation arm 71 extends forward from valve 70, and moves up and down depending upon the changes in spacing between attachment plate 120 and a support plate 124, which are transmitted to the arm by a push rod 68.

A panhard rod 152 is mounted between a downward oriented bracket 148, depending from attachment plate 120, and a upward oriented bracket 150, positioned on support plate 124.

Figure 11:
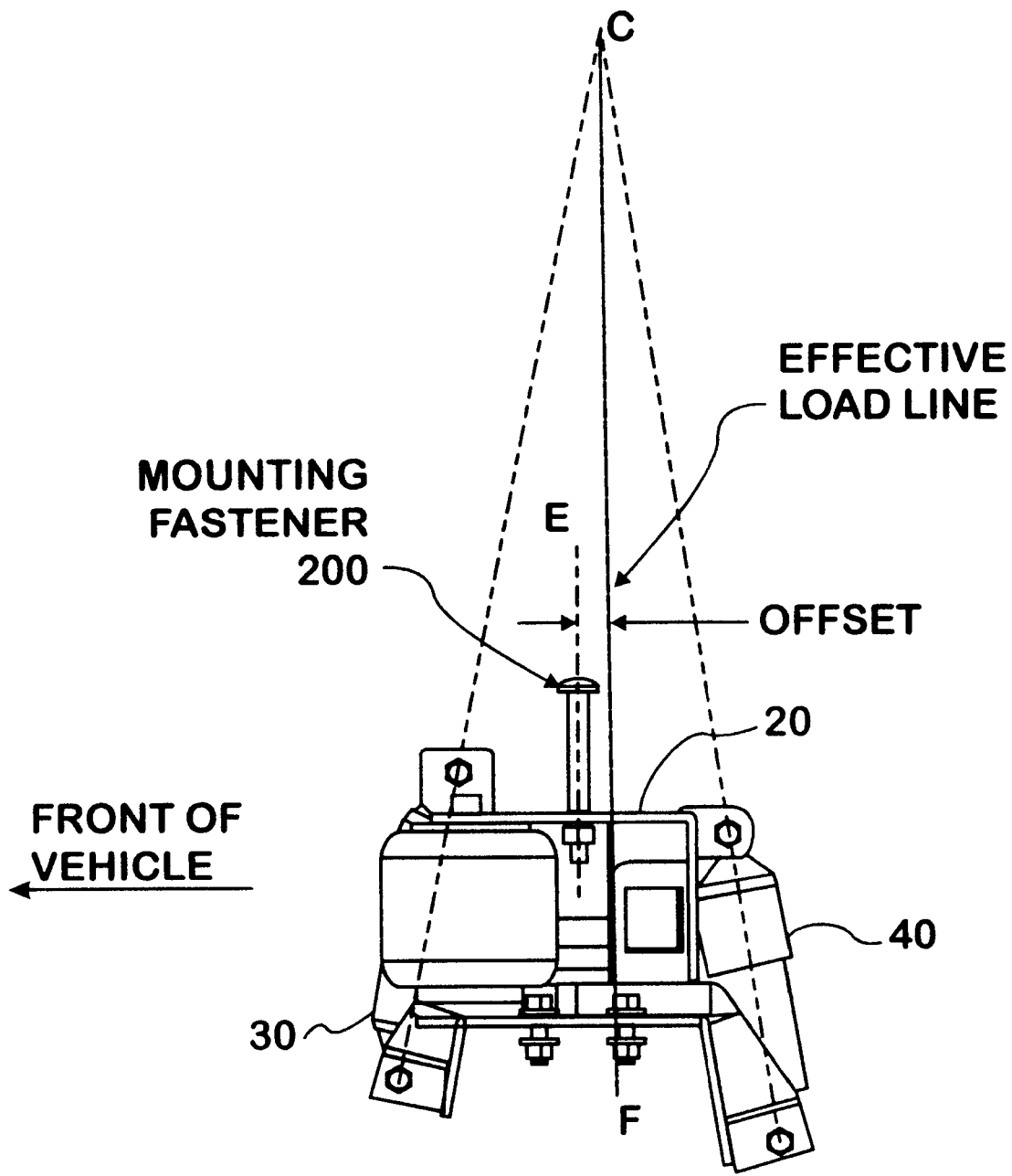
FIG. 11 is a side elevation illustrating operating principals of the invention.

FIG. 11 illustrates location and orientation of shock absorbers 30 and 40 (and in a way equally applicable to shock absorbers 130 and 140) to effect a minimum offset between the line E of mounting fasteners 200 between attachment plate and a cab rear sill and the load line F of forces generated by the shock absorbers. Shock absorbers 30 and 40 generate forces in line with the central axes of the shock absorbers, which intersect at point C. The effective load line F, a line intersecting point C and perpendicular to attachment plate 20 should have a minimum offset from the line E of the mounting fasteners to minimize twisting about the fasteners.

The invention provides cab suspension with a minimum of twisting about the rear sill element of the cab frame. The size of the mechanism in minimal and it is mechanically simple, while providing good mechanical isolation against vibration and shock.

While the invention is shown in only one of its forms, it is not thus limited but is susceptible to various changes and modifications without departing from the spirit and scope of the invention.

What is claimed is:

1. A vehicle comprising:
   a frame having a pair of parallel, elongated side rails on either side of a vehicle longitudinal axis and a cross member connected between the pair of parallel, elongated side rails;
   a passenger cab positioned above the cross member and having a bottom side; and
   a suspension unit supporting the cab from the cross member, the suspension unit comprising, an attachment plate connected to the bottom side of the passenger cab above the cross member, a compression spring positioned between the attachment plate and the cross member, and front and rear shock dampening units substantially aligned in a plane including the vehicle longitudinal axis and canted inwardly toward one another from bottom to top to generate damping force along lines intersecting above the connection between the attachment plate and the bottom side of the cab in the plane including the vehicle longitudinal axis.

2. A vehicle as set forth in claim 1, the cab further comprising a load bearing rear sill element, which is positioned over the cross member for support and which is directly fastened to the attachment plate.

3. A vehicle as set forth in claim 2, wherein the shock dampening devices are pivotally attached at their respective upper ends to the attachment plate at points spaced to either side from a latitudinal center line of the rear sill element.

4. A vehicle as set forth in claim 3, the spring comprising a pair of air springs, one on either side of the vehicle longitudinal axis and aligned perpendicular to the vehicle longitudinal axis on a line of support between the points of attachment of the front and rear shock dampening devices.

5. Apparatus comprising:
   a support body;
   a suspended body positioned above the support body;
   a support plate attached to the suspended body and positioned over the support body;
   a pair of vertically oriented air springs having upper and lower ends the lower end of each air spring being mounted on the support body and the upper end of each air spring being attached to the support plate, the points of attachment between the pair of air springs and the support plate defining a first axis of support across the support plate; and
   first and second shock absorbers connected between the support plate and the support body, the points of attachment of the first and second shock absorbers to the support plate being spaced and defining a second axis of support perpendicular to and bisectins the first axis of support.

6. The apparatus of claim 5, the suspended body further comprising a rear sill, the support plate being positioned under and attached to the rear sill.

7. The apparatus of claim 6, the suspended body and the support body having a front end and a rear end with the support body being elongated in the direction from the front to rear ends and the first and second shock absorbers being positioned along a central longitudinal axis of the support body.

8. The apparatus of claim 7, the first and second shock absorbers being inwardly inclined toward their respective upper ends where attached to the support plate.

9. The apparatus of claim 8, further comprising a panhard positioning rod connected at one end to the supporting body and at an opposed end of the attachment plate to restrain the attachment plate and supporting body from separating.

10. A truck cab suspension system comprising:
    a support body;
    an attachment plate positioned over the support body;
    a pair of air springs supported on the support body and underlying the attachment plate arranged to exert upward force on the attachment plate in a plane; and
    fore and aft shock absorbers aligned in a plane located between the pair of air springs and perpendicular to the plane in which the air springs exert upward force, the fore and aft shock absorbers each being connected between the support body and the attachment plate at spaced points of connection.

11. A truck cab suspension as set forth in claim 10, further comprising:
    pivot mounts between the fore and aft shock absorbers and the support body and the attachment plate; and
    the fore and aft shock absorbers being canted inward toward one another at one end.

* * * * *